United States Patent Office 3,423,400
Patented Jan. 21, 1969

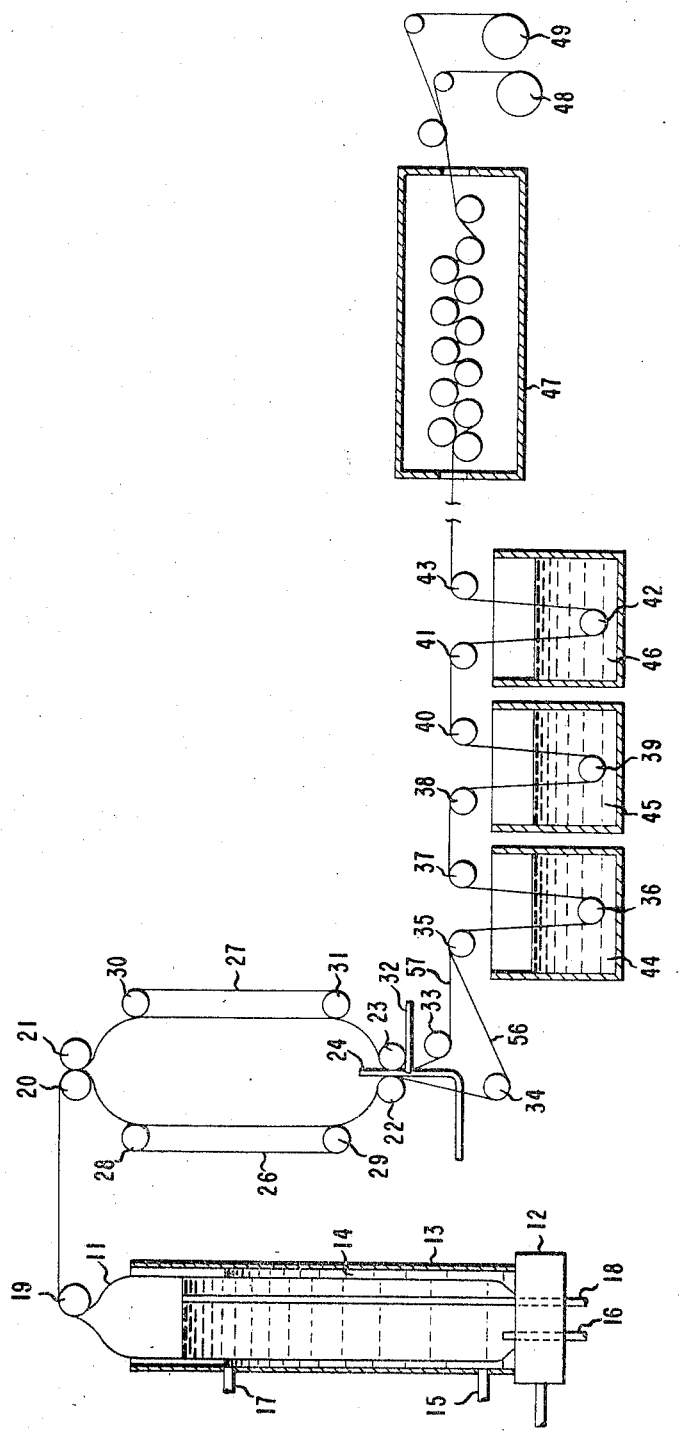

3,423,400
REGENERATED CELLULOSE FILM
Robert Otto Osborn, Buffalo, N.Y., assignor to E. I. du Pont de Nemours and Company, Wilmington, Del., a corporation of Delaware
Original application Feb. 4, 1965, Ser. No. 432,443, now Patent No. 3,280,234, dated Oct. 18, 1966. Divided and this application Apr. 27, 1966, Ser. No. 571,659
U.S. Cl. 260—212                                    4 Claims
Int. Cl. C08b 9/00, 29/30

ABSTRACT OF THE DISCLOSURE

Regenerated cellulose film having a specified degree of polymerization, volume swelling, and a maximum orientation angle of the voids.

---

This application is a division of my copending application Ser. No. 432,443, now U.S. Patent 3,280,234, which is a continuation-in-part of my copending application Ser. No. 124,615 filed July 17, 1961, now abandoned.

It is generally conceded that the economical route to a flat film is through the preparation of a polymeric film in tubular form. The tubular extrusion die requires much less space than the flat die required to produce the same amount of flat film. When producing thin films, slight imperfections in the lips of the extruder tend to produce large variations across the width of the film. These imperfections can be removed by machining but are virtually impossible to remove permanently. Since a tubular extrusion die can be rotated, the variations across the width of the tubular film due to lip imperfections can be minimized or, at least, scattered in a manner that reduces their effect. The film in tubular form can be processed, i.e. cooled, expanded, etc. more easily than a correspondingly, wide flat film. Thus, the preparation of such drycast films as polyethylene and the like are almost invariably accomplished by extruding and processing in tubular form.

The preparation of regenerated cellulose film from viscose, however, is quite another story. Although there have been suggestions sprinkled throughout the long history of regenerated cellulose film of extruding a viscose film in tubular form and then slitting the tubular film into flat strips of any desired width, such a process has never achieved any commercial success. The fact that regenerated cellulose film is prepared by a wet-, rather than a dry-casting process, is no doubt a strong contributing factor towards this lack of success. Other reasons for this apparent failure stem from the extreme weakness of the freshly-extruded viscose film and the admonitions of the prior art against imposing tension on such film. This weakness is particularly a hindrance at viscose viscosities at which it is most efficient and desirable to operate, say, about 12,000 poises.

It is an object of this invention to provide a process for the tubular extrusion of regenerated cellulose film that overcomes the aforementioned difficulties. Other objects will appear hereinafter.

The objects are accomplished by extruding viscose in the form of a tubular film into a coagulating bath without any contact of the extruded viscose with air between the extrusion orifice and the coagulating bath; immediately expanding the tubular film in the bath while simultaneously advancing the tubular film through the bath, the rate of advancement and the amount of expansion being sufficient to stretch the tubular film as extruded at least 1.5 times, preferably 1.5–3 times in the longitudinal and transverse directions; and, thereafter, slitting the tubular film longitudinally to provide at least one flat sheet of film; completing the regeneration of the film and then purifying and drying the film. In the simultaneous advancing and expansion steps, it is preferred to expand and advance to stretch the tubular film an equal amount in both directions. The film is then stretched in the transverse direction after the simultaneous two-directional stretching step by expanding the film an additional amount not to exceed about 50% of the film's circumference, i.e. to provide a total transverse-directional or lateral stretch of up to 2.25 times (for an initial stretch of 1.5×) and preferably not more than 4.5 times the extruded circumference (for an initial stretch of 3×). The preferred amount of expansion in this second expansion step is 20–30% of the film's circumference to provide a preferred total stretch of 3.0–3.0 times the extruded circumference.

It is important to note that expansion to about 3× in each direction is the maximum that can be obtained in the first or initial stretching step without reducing the amount the tube can be expanded in the second stretching step. On the other hand, stretching less than 1.5× in each direction in the first or initial stretching step does not produce the outstandingly beneficial effects of property enhancement obtained by practice of the present invention. Furthermore, stretching less than 1.5× in each direction in the first stretching step requires the use of extremely narrow die lip openings when it is desired to produce very thin films and the use of such narrow die openings has the complication and disadvantage of requiring more carefully filtered viscoses. In addition, if the first stretch is carried to less than 1.5× in each direction, it is found that attempts to carry out the second stretch step often leads to splitting of the tubing along the machine direction.

The second stretching step of 20 to 50% greater than the tube dimension after the first stretch is likewise important. Attempts to stretch the film to a greater extent than about 50% beyond the size of the tubing after the first stretch leads to a considerable amount of breakage of the film, particularly if the first stretch is more than 2×. Stretching less than 20% in the second stretching step causes formation of a film having undesirable dimensional stability characteristics.

It is particularly essential for saitsfactory operation according to the present invention that the viscose be extruded directly into the coagulating bath, i.e. that the orifice lips of the extrusion die actually be immersed under the surface of the coagulating liquid. This is important in order to give the extruded viscose strength or "body" immediately sufficient to withstand the immediate expansion and stretching of the tube. Unlike many other materials, including those from which most plastic films are formed, viscose at the time of extrusion from the die lips is incapable of being self-supporting and therefore is incapable of being expanded with any sort of controllable or reproducible uniformity prior to at least partial coagulation by a coagulating bath.

In the drawing, FIGURE 1 is a diagrammatic side elevation of an apparatus for carrying out the process of the invention.

In carrying out the process, viscose is first prepared in the conventional manner. Alkali cellulose is prepared by steeping sheets of wood pulp or cotton linters in a caustic solution containing 17%–20% sodium hydroxide at temperatures of 22–28°C. for 20–40 minutes. Preferably, the source of cellulose is chosen to provide cellulose having an initial degree of polymerization (DP) of at least 600. After pressing the alkali cellulose sheets to a press-weight ratio of 2–4:1, the sheets are aged for a period necessary to provide an ultimate viscose viscosity of 50–500,000 poises, preferably about 12,000 poises. To provide an ultimate film having a high degree of polymerization (at least 600), the alkali cellulose is not aged but subjected directly to xanthation.

Normally, the alkali cellulose sheets are shredded and then xanthated with 30%–50% carbon disulfide, based on the weight of dry cellulose. Xanthation is carried out in a baratte for 1–3 hours while the temperature is maintained between 30 and 40°C. Afterward, the xanthated alkali cellulose is mixed with dilute (10–20%) caustic, then stirred at a temperature of 5–10° C. for about 3 hours to provide a cellulose content of 9%–15% in the viscose solution. The viscose is then deaerated, filtered and ripened to a salt index between 0.5 and 5 by aging at about 20° C.

As stated above, the cellulose content of the viscose may vary from 9% to about 15%. The particular cellulose content used will depend upon the degree of polymerization of the cellulose used in the preparation of the viscose. Thus, using cellulose with a degree of polymerization of 1500, it is possible to prepare viscose containing up to about 12% cellulose and still obtain the preferred viscosity of about 12,000 poises. When the cellulose has a degree of polymerization of 800, it is possible to employ viscose containing up to about 15% cellulose and obtain a viscose viscosity of about 12,000 poises. It should be understood that the minimum useful degree of polymerization is about 500. It should also be understood that the present invention can utilize viscose solutions having viscosities as high as 500,000 poises. Such viscose solutions contain about 15% cellulose, the cellulose having a degree of polymerization of about 1500. It is also possible to use viscoses normally employed in the conventional manufacture of regenerated cellulose, such viscoses having a viscosity of about 50 poises. For the most durable film that can be produced by the process of this invention, it is necessary that the cellulose in the ultimate regenerated cellulose film have a degree of polymerization of at least 400 and the viscose used should contain at least 10% cellulose.

With regard to the salt index of the viscose, it has been found that the process of the invention operates most successfully when the salt index lies between 1.0 and 2.0. The process can be operated at a salt index as low as 0.8, and, with caution, the process can be successfully carried out using a salt index as low as 0.5. An upper limit of 2.5 tends to minimize the tendency to obtain a hazy film. However, this tendency to obtain a hazy film can be reduced to some extent by adding small amounts of formaldehyde or formaldehyde-yielding materials to the viscose just prior to casting. In this way, viscoses having salt indices up to 5 or even higher may be employed.

After the preparation of the viscose solution, the viscose is formed into a film using the arrangement shown in FIGURE 1. The viscose is first extruded through a circular die 12 having a lip opening of 10–60 mils into an enclosure or tank 13 containing coagulating liquid 14 to form a tubular film 11. The hopper lip opening should be at least 5 times the ultimate thickness of the gel regenerated cellulose film after stretching and may be as high as 20 times the film thickness. The circular die may be used in a stationary position or the die can be rotated or oscillated to reduce variations in the thickness across the width of the ultimate film.

The coagulating liquid into which the tube is extruded may be an aqueous solution containing 40%–55% ammonium sulfate and up to 5% sulfuric acid maintained at a temperature of 80–95° C. However, it is also possible to use a regenerating bath containing 4%–15% sulfuric acid and 5%–20% sodium sulfate at a temperature of 25–60° C. The use of the more economical regenerating bath is preferred since the simultaneous expansion and advancing steps must be performed quickly (expansion immediately upon emergence from the die lips), before any substantial regeneration has occurred. In other words, it is desirable that the stretching of the film simultaneously in the two mutually perpendicular directions by expansion and advancing to be carried out on a film that is at least partially coagulated but not regenerated to any substantial extent.

The liquid for coagulation is fed into the tank 13 through inlets 15 and 16. The liquid entering through inlet 15 serves to coagulate the outside surface of the film and the liquid entering at 16 serves to coagulate the inside surface of the film. Outlets 17 and 18 serve to maintain the desired level of coagulating liquid around and within the tubular film.

It will be noted that the liquid level within the tubular film is maintained above the level outside the film. This difference in liquid level provides hydraulic pressure that serves to expand the tubular film. For a 5-inch diameter die, a difference in level of 0.3 inch to 2 inches is usually adequate to provide an expansion (transverse stretch) of 1.5–3 times the extruded diameter of the film. It is also possible to expand the film by using, as an alternative, gas pressure within the tubular film, the gas being supplied through an inlet in the circular die 12. Combinations of gaseous or pneumatic pressure within the tube and hydraulic pressure outside the tube or hydraulic and pneumatic pressure within the tube combined with annular restraining means around the tube may also be employed. When hydraulic pressure is used, the liquids employed within or outside the tube may have the same or different densities.

The film is then passed over guide roll 19 through the nip of rolls 20 and 21 and then through the nip of positively driven rolls 22 and 23. Rolls 20 and 21 are driven rolls which serve to advance the film at a rate of 1.5–3 times the extrusion rate, and preferably, to provide an amount of longitudinal stretching equal to the transverse stretching provided in the aforementioned expansion. Between the two sets of nip rolls, the tubular film is expanded to stretch the film in the lateral or transverse direction an additional amount of up to 50% beyond the size of the tubing obtained after the first two-way stretching step. A tube 24 admitted through a circumferential groove in the surface of roll 23 conveys air or some other gaseous medium for this additional expansion of the tubular film. It is also possible, although not preferred, to slit the film after advancement over roll 19 without applying the additional expansion step.

In accordance with the teachings in Osborn United States Patent No. 3,121,761 and Hafstad and Wilson United States Patent No. 3,121,762, both issued Feb. 18, 1964, it is desirable to provide at least one lane having a wall thickness that is less than the wall thickness of the remainder of the tubular film. For this purpose, moving belts 26 and 27 may be provided to resist the additional expansion of the tubular film 11 by contacting the circumference of the tubular film except for the longitudinal lane and a corresponding lane on the underside of the tubular film. The endless belts may be moved at the same rate as the advancing tubular film by the driven rotating rolls 28, 29, 30 and 31. This differential wall thickness may also be obtained by restricting the original expansion along at least one longitudinal lane in the coagulating tank 13 as shown in FIGURE 2 of the aforementioned U.S. Patent No. 3,121,761.

After leaving the second expansion step, the expanded film is collapsed through nip rolls 22 and 23 and the film is slit by a knife 32 to provide two sheets of films. If reduced thickness lanes have been provided, then slitting occurs along the center of the reduced thickness lanes. The resulting two flat sheets of gel film 56 and 57 are then led as superimposed sheets by rolls 33–43 through a sulfuric acid-metal sulfate regenerating bath 44, the purification bath 45 and the softening bath 46. The film sheets are then led to the drying chamber 47 and the dried sheets are separated and wound on rolls 48 and 49. It has been found that when regenerated cellulose film is composed of cellulose having a degree of polymerization of at least 400, is made from a viscose having a minimum cellulose content of 10% and having a minimum viscosity of 4000 poises, the softening step may be omitted and yet a regenerated cellulose film of excellent durability is still obtained.

The product resulting from the process of this invention is characterized by an extremely high durability as indicated by stress-flex values of 35–40 and excellent dimensional stability as indicated by a transverse direction swelling value no greater than 13%, preferably no greater than 10%. To achieve these results, the film must be composed of cellulose having a degree of polymerization of at least 300, preferably at least 500 (although there is no limit in the maximum desired DP, 700 seems to be a practical maximum), a number of voids in the film as represented by a percent volume swelling of 85%–165%, preferably between 85% and 115%, and an orientation of the voids as represented by an orientation angle below 45°, preferably below 42°.

The following theory is offered to explain the relationship between the composition of the novel regenerated cellulose product, the characteristics of the viscose used and the surprisingly improved properties of the product. It is submitted that this theory should not be considered as limitative in any way. As stated previously, the regenerated cellulose product must be composed of cellulose having a degree of polymerization of at least 300, and of voids represented by a volume swelling of 85%–165%, the voids having an orientation as reflected by an orientation angle of less than 45°. The relatively high degree of polymerization of the cellulose contributes to the overall improvement in the physical properties of the film product. The reduction in voids, which is probably due to the use of a relatively high solids viscose and to forced collapsing of the cellulose structure by expansion as the film emerges from the die, is believed to contribute materially to the increase in durability of the regenerated cellulose film product. The orientation of the voids, it is believed, is related to the excellent dimensional stabiliy of the final regenerated cellulose film.

The orientation of the void areas is believed to occur primarily during the additional transverse stretching step that is performed subsequent to the simultaneous two-directional stretching step. Just how this orientation occurs is not well understood. A measure of this orientation can be made by using either birefringence methods or X-ray methods. Although the orientation angle obtained by X-ray methods is primarily a measurement of the crystalline regions of the film, it is believed that a measurement of the orientation of the associated amorphous areas containing the void portions is also realized. In fact, it has been found that a measurement of the X-ray orientation angle is a more reliable measure of the orientation of the voids in this case, even through it is indirect, than is the birefringence measurement.

The film product of this invention finds application wherever regenerated cellulose films had been used previously. Thus, the film may be used in the packaging of dry and wet foods, textiles, cigarettes, cigars, etc. The film may also be used in tapes, windings on wire and electrical cables and as a decorative material.

The invention will be more clearly understood by referring to the examples which follow. Example 3 represents the best mode contemplated for carrying out the invention.

Examples 1–3

Alkali cellulose was prepared from sheets of paper-grade wood pulp, in which the cellulose had a degree of polymerization of 1000, by steeping the sheets in an aqueous solution containing 18.5% caustic at 23° C. for 30 minutes. The resulting alkali cellulose was then pressed to a press-weight ratio of 2.8:1. The steeped sheets were shredded at about 30° C. in a conventional shredder for two hours. Immediately thereafter the unaged alkali cellulose was xanthated by reaction with 35% carbon disulfide based on the weight of the dry pulp. Xanthation was carried out in a conventional baratte maintained at a temperature of about 35° C. for two hours. Dilute caustic solution was then admitted to the xanthated alkali cellulose and the mixture was stirred in the same vessel at a temperature between 5 and 10° C. for a period of three hours. The resulting viscose, containing 10% cellulose, was then deaerated by introducing it into a blow case maintained under reduced pressure and filtered by passing through a coarse 120-mesh screen. The viscose having a salt index [1] of 1.3 was extruded through the lips of a circular die, the lip opening of the die being 30 mils, into an aqueous bath containing 50% ammonium sulfate and maintained at a temperature of 90° C. The casting arrangement was that shown in FIGURE 1. It was set up so that the aqueous coagulating bath was supplied simultaneously to the tank and the interior of the extruded tubing, the level of the bath in the interior of the tubing being 0.4 inch above that on the exterior of the tubing. The resulting hydraulic pressure and the speed of the advancing rolls served to stretch the tubing, immediately upon emergence from the casting die, to an extent of 2.5 times in both the machine and transverse directions.

The resulting tubing was then advanced between the two sets of nip rolls where it was expanded pneumatically by maintaining air at a pressure of 10 inches of water within the interior of the tubular film. The additional transverse expansion of the tubing was carried out until the diameter of the expanded tubing had increased by 30% over the initial stretched dimension. The resulting expanded tubing was then slit into two flat sheets, which were advanced simultaneously through an aqueous regenerated bath containing 12% sodium sulfate and 3% sulfuric acid. The regenerated cellulose film sheets were then purified and dried in the conventional manner. The cellulose in the film resulting from this example had a degree of polymerization of 600.

In Example 2, a viscose with the same cellulose content as in Example 1 was employed but the degree of polymerization of the cellulose used was 700. After casting the film and purifying the final sheet as in Example 1, the cellulose in the final film had a degree of polymerization of 400.

In Example 3, the viscose was the same as used in Example 1 but it was cast into a bath containing 12% sulfuric acid and 18% sodium sulfate at 35° C. In all other respects, the procedure followed that described in Example 1 and the degree of polymerization of the final cellulosic film was 600.

In each example, a one-mil thick film was obtained. Its structural characteristics and properties are presented in the following table:

---

[1] Salt index is determined by adding the viscose dropwise into a vigorously agitated solution of sodium chloride. The strength of solution expressed as percent which will just precipitate cellulose from the viscose solution is taken as the salt index.

TABLE I.—STRUCTURAL CHARACTERISTICS AND PROPERTIES OF THE FILMS OF EXAMPLES 1-3

| Example | Structural Characteristics | | | | Properties | | | | | |
|---|---|---|---|---|---|---|---|---|---|---|
| | Volume Swelling (percent) | Orientation Angle (degrees) | Degree of Polymerization | TD Swelling (percent) | Stress-Flex (strokes) | Initial Tensile Modulus (p.s.i.) | Tensile Strength (p.s.i.) | Elongation (percent) | Tear Strength (gms./mil) | Pneumatic Impact Strength (kg.-cm.) |
| 1 | 92 | 40 | 600 | 9 | 40 | 908,000 | 21,200 | 32 | 16.3 | 4.9 |
| 2 | 99 | 40 | 400 | 9 | 18 | 900,000 | 20,800 | 20 | 14.0 | 3.0 |
| 3 | 103 | 37 | 600 | 9 | 36 | 922,000 | 21,600 | 24 | 15.0 | 3.5 |

In contrast to the above results, a 1-mil thick regenerated cellulose film, cast through a flat die in the conventional manner using the viscose of Examples 1 and 3 and the bath of Example 3 (12% sulfuric acid—18% sodium sulfate at 35° C.) displayed a stress-flex of 5 strokes.

The structural characteristics and properties were determined using the following procedures:

Percent volume swelling is determined by measuring the length, width and thickness of a given sample under dry and wet conditions. The sample is conditioned at 50% relative humidity and a first measurement is made after which the sample is immersed in water at room temperature (24° C.) for 20 minutes; the sample is removed from the water bath, excess water quickly removed and the dimensions of the sample again are measured.

Percent transverse direction (T.D.) swelling is determined by measuring the change in transverse dimension of the film sample conditioned at 50% relative humidity and after immersion in water at 24° C. for 20 minutes, as described above.

Orientation angle is determined by mounting the sample in an X-ray apparatus so that the beam passes parallel to the machine direction axis of the film and perpendicular to the plane of the transverse and thickness direction axes of the film. The sample is then rotated about the machine direction axis and in the plane of the transverse and thickness direction axes to produce an X-ray diffraction pattern, the peak intensity of which is measured goniometrically. The orientation angle is defined as the width of the peak at the half maximum diffracted intensity. The values shown herein are for the T.D. orientation angle.

Degree of polymerization (D.P.) is determined by measuring the viscosity of a cupriethylene diamine solution of the cellulose and as described in TAPPI Test T-230 relating degree of polymerization (D.P.) to viscosity by the following relationship:

$$D.P. = \frac{\log n - 0.4472}{1.295 \times 10^{-3}}$$

where $n$ is the viscosity in centipoises of a 1% solution of cellulose in cupriethylene diamine.

Stress-flex, recently described by H. C. Horst and R. E. Martin, Modern Packaging, volume 37, No. 7, March 1961, p. 123, is a measure of the flexibility and durability of the film. A sample of film 4" x 7" is placed between two rubber-faced clamps one inch apart. One clamp is stationary, the other slides back and forth by gravity on two rods flexing the film as the whole assembly rotates, until the film sample breaks. The stress-flex value indicates the number of strokes of the movable clamp until the film sample breaks. For the tests at 75° F. the samples pre-conditioned at 75° F.; the sliding clamp has a weight of four pounds.

Tensile strength, elongation and initial tensile modulus. These measurements are made at 23° C. and 50% relative humidity. They are determined by elongating the film sample (samples are cut with a Thwing-Albert Cutter which cuts samples ¼" wide) in an Instron tensile tester at a rate of 100% minute until the sample breaks.

The force applied at the break in lbs./square inch (p.s.i.) is the tensile strength. The elongation is the percent increase in the length of the sample at breakage. Initial tensile modulus in p.s.i. is directly related to film stiffness. It is obtained from the slope of the stress/strain curve drawn through the origin and tangent to the curve at an elongation of 1%; both tensile strength and initial tensile modulus are based upon the initial cross sectional area of the sample. Where single values are given, they are the same in both longitudinal and transverse directions.

Tear strength is determined as described by D. W. Flierl, Modern Packaging, 52 129 (1951).

Pneumatic impact strength is the energy required to rupture a film. It is reported in kilograms-centimeters/mil of thickness of the film sample. Pneumatic impact strength is determined by measuring the velocity of a ball mechanically accelerated by air pressure, first in free flight and then in flight immediately after being impeded by rupturing the test film sample. In this test, the film sample is 1¾" x 1¾". The projectiles are steel balls ½" in diameter and weighing 83. grams. The free flight ball velocity is 40 ± 2 meters/second. The velocities are measured by timing photoelectrically the passage of the steel balls between two light beams set a definite distance apart. The pneumatic impact strength is measured by the loss in kinetic energy of the ball due to the rupturing of the film sample. It is calculated from the following formula:

Constant X/square of velocity in free flight-square of velocity in impeded flight. where the constant is directly proportional to the weight of the projectile and inversely proportional to the acceleration due to gravity. This test is carried out at 23° C. and 50% relative humidity and the test samples are conditioned for 24 hours at 23° C. and 50% relative humidity.

Example 4

Viscose, containing 11.6% cellulose, was preprared from cellulose having a degree of polymerization of 1200 as in Example 1. The viscose was extruded in the form of a tubular film using the arrangement shown in FIGURE 1, except that the belts 26 and 27 were submerged in tank 13 to form the lanes of differential thickness during the first stretching step rather than during the second stretching step. The bath consisted of 12% sulfuric acid and 18% sodium sulfate and was maintained at a temperature of 25° C. The liquid levels within the tubular film and around the film and the rates of extrusion and advancement were arranged to stretch the film 2.5 times simultaneously in the longitudinal and transverse directions. The second stretching step, performed using pneumatic pressure, served to increase the width of the film an additional 30%. After stretching, the tubular film was processed as in Example 1. The dry regenerated cellulose film had a thickness of 0.76 mil.

In a control, a viscose was prepared containing 8.8% cellulose. In all other respects, the control was performed identically with Example 4. The dry regenerated cellulose film had a thickness of 0.6 mil.

The structural characteristics and the physical properties of both films are presented in Table II.

TABLE II.—STRUCTURAL CHARACTERISTICS AND PROPERTIES OF THE FILMS OF EXAMPLE 4 AND CONTROL

| | Structural Characteristics | | | | Properties | | | | | |
|---|---|---|---|---|---|---|---|---|---|---|
| | Volume Swelling (percent) | Orientation Angle (degrees) | Degree of Polymerization | T.D. Swelling (percent) | Stress-Flex (strokes) | Initial Tensile Modulus (p.s.i.) | Tensile Strength (p.s.i.) | Elongation (percent) | Tear Strength (gms./mil) | Pneumatic Impact Strength (kg.-cm.) |
| Example 4 | 90 | 40 | 600 | 9 | 26 LD / 26 TD | 990,000 / 890,000 | 20,000 / 19,000 | 22 / 25 | 8 / 11 | 3.3 |
| Control | 170 | 44 | 600 | 13 | 7 LD / 7 TD | 830,000 / 1,090,000 | 14,000 / 20,000 | 15 / 13 | 5 / 5 | 0.9 |

Examples 5 and 6

In these examples, a conventional viscose was processed in accordance with the present invention using a conventional bath. Thus, viscose containing 9% cellulose and 5.2% sodium hydroxide and prepared using 25.5% carbon disulfide was cast into a bath containing 12% sulfuric acid and 18% sodium sulfate. The viscose having a viscosity of 55 poises was cast at a salt index of 1.0.

In Example 5, the viscose had been aged so that the ultimate film was composed of cellulose having a degree of polymerization of 300; in Example 6, 600. The arrangement was substantially identical to that used in Example 4 so that the film were stretched 2.5 times first in two directions. In Example 5 the film was not given the second stretch; in Example 6 the film was stretched an additional 30% in the transverse direction.

As a control, the conventional viscose described in the first paragraph was processed into a film using the bath described above in accordance with the conventional procedure described in U.S. Patent 1,548,864 to Brandenberger except that the film did not contain softening agent; the test films of Examples 5 and 6 likewise contained no softener.

The structural characteristics and the physical properties are presented in Table III. The films were one mil thick. It will be noted that although some of the properties of the films of the invention are not outstandingly increased by using the process of the invention with conventional viscose and a conventional bath, the durability (stress-flex), the tear strength and dimensional stability, particularly in the film containing the higher D.P. cellulose are both substantially improved.

TABLE III.—STRUCTURAL CHARACTERISTICS AND PROPERTIES OF THE FILMS OF EXAMPLES 5-6 AND CONTROL

| Example | Structural Characteristics | | | | Properties | | | | | |
|---|---|---|---|---|---|---|---|---|---|---|
| | Volume Swelling (percent) | Orientation Angle (degrees) | Degree of Polymerization | T.D. Swelling (percent) | Stress-Flex (strokes) | Initial Tensile Modulus (p.s.i.) | Tensile Strength (p.s.i.) | Elongation (percent) | Tear Strength (gms./mil) | Pneumatic Impact Strength (kg.-cm.) |
| 5 | 155 | 44 | 300 | 13 | 11 LD / 11 TD | 1,260,000 / 845,000 | 26,000 / 16,000 | 15 / 25 | 3.4 / 7.5 | 2.5 |
| 6 | 160 | 42 | 600 | 10 | 36 LD / 36 TD | 916,000 / 916,000 | 18,000 / 18,000 | 30 / 30 | 7.1 / 7.1 | 3.5 |
| Control | 180 | 47 | 300 | 15 | 5 LD / 5 TD | 1,200,000 / 800,000 | 24,000 / 14,000 | 10 / 20 | 3 / 4 | 2.3 |

Examples 7 and 8

For Example 7, the procedure described in Example 1 was repeated. The viscose containing 11.2% cellulose, the cellulose having a degree of polymerization of 1000, was cast at a salt index of 1.2 into an aqueous bath at 90° C. containing 50% ammonium sulfate through a die lip opening of 30 mils. The emerging tubular film was stretched about 2.7 in the transverse and longitudinal directions. After being removed from the bath, the film was subjected to an additional expansion step as in Example 1 to provide an additional 20% transverse stretch. The tubular film was then slit; regeneration was completed; and the film sheets were purified and dried to provide a 1-mil thick regenerated cellulose film.

In Example 8, the additional expansion of 20% was omitted. Instead, the tubular film was slit after being stretched 2.7× simultaneously in two directions and then processed as in Example 7. To provide a final 1-mil thick film, the die lip opening was narrowed to 25 mils.

The structural characteristics and the physical properties of both films are presented in the following table:

TABLE IV.—STRUCTURAL CHARACTERISTICS AND PROPERTIES OF THE FILMS OF EXAMPLES 7 AND 8

| Example | Structural Characteristics | | | | Properties | | | | | |
|---|---|---|---|---|---|---|---|---|---|---|
| | Volume Swelling (percent) | Orientation Angle (degrees) | Degree of Polymerization | T.D. Swelling (percent) | Stress-Flex (strokes) | Initial Tensile Modulus (p.s.i.) | Tensile Strength (p.s.i.) | Elongation (percent) | Tear Strength (gms./mil) | Pneumatic Impact Strength (kg.-cm.) |
| 7 | 92 | 40 | 600 | 9 | 40 LD / 40 TD | 908,000 / 908,000 | 21,200 / 21,200 | 32 / 32 | 16 / 16 | 4.9 |
| 8 | 101 | 44 | 600 | 12 | 36 LD / 36 TD | 1,030,000 / 800,000 | 25,600 / 18,400 | 22 / 31 | 11 / 19 | 4.5 |

The dimensional stability characteristics of these films were also tested by over-wrapping packages with each of the films and exposing the wrapped packages to atmospheres having relative humidities of 20% and 80%. The package wrapped in the film of Example 7 was essentially free of ripples; the film of Example 8 showed only very slight rippling. In contrast, a package wrapped in a conventionally produced regenerated cellulose film (Control for Examples 5 and 6—Table III) was very heavily rippled after exposure to the same conditions.

Having fully disclosed the invention, what is claimed is:

1. A regenerated cellulose film wherein the cellulose has a degree of polymerization of at least 300 and less than about 1500, the volume swelling of said film being 85%–165%, the transverse direction swelling value being no greater than 10%, and the orientation angle being below 45°.

2. A regenerated cellulose film as in claim 1 wherein the degree of polymerization of the cellulose is at least 500.

3. A regenerated cellulose film as in claim 1 wherein the volume swelling is 85%–115%.

4. A regenerated cellulose film as in claim 1 wherein the orientation angle is below 42°.

References Cited

UNITED STATES PATENTS 2,234,964    3/1941    Czapek _____ 161—46

DONALD E. CZAJA, *Primary Examiner.*

R. W. MULCAHY, *Assistant Examiner.*

U.S. Cl. X.R.

161—46; 106—168